United States Patent [19]

Sims

[11] Patent Number: 4,782,910
[45] Date of Patent: Nov. 8, 1988

[54] BI-POLAR BENDER TRANSDUCER FOR LOGGING TOOLS

[75] Inventor: Claude C. Sims, Orlando, Fla.

[73] Assignee: Mobil Oil Corporation, New York, N.Y.

[21] Appl. No.: 129,911

[22] Filed: Dec. 4, 1987

Related U.S. Application Data

[63] Continuation of Ser. No. 866,560, May 23, 1986, abandoned.

[51] Int. Cl.⁴ .................. G01V 1/40; H01L 41/10
[52] U.S. Cl. ...................... 181/106; 367/160; 367/165; 181/402; 310/349; 381/205
[58] Field of Search ............ 310/349; 181/402; 367/165

[56] References Cited

U.S. PATENT DOCUMENTS

| | | | |
|---|---|---|---|
| 3,158,762 | 11/1964 | Hara | 367/161 |
| 3,354,426 | 11/1967 | Massa | 367/160 |
| 3,360,664 | 12/1967 | Straube | 367/160 |
| 3,370,187 | 2/1968 | Straube | 367/161 |
| 3,582,698 | 6/1971 | Baker | 310/321 |
| 3,593,255 | 7/1971 | White | 367/912 |
| 3,714,475 | 1/1973 | Baker | 310/321 |
| 4,131,874 | 12/1978 | Geohegan | 310/337 |
| 4,140,936 | 2/1979 | Bullock | 310/331 |
| 4,184,093 | 1/1980 | Sullivan | 310/331 |
| 4,431,873 | 2/1984 | Dunn | 367/165 |
| 4,503,350 | 3/1985 | Nakatani | 310/368 |
| 4,516,228 | 5/1985 | Zemack | 367/160 |
| 4,517,664 | 5/1985 | Berglund | 367/165 |
| 4,536,862 | 8/1985 | Sullivan et al. | 367/160 |
| 4,649,525 | 3/1987 | Angana et al. | 181/106 |
| 4,679,178 | 7/1987 | Larson et al. | 367/157 |

FOREIGN PATENT DOCUMENTS

| | | | |
|---|---|---|---|
| 727792 | 2/1966 | Canada | 367/160 |
| 0279345 | 6/1949 | Switzerland | 310/330 |
| 2122351 | 1/1984 | United Kingdom | 181/106 |
| 2124377 | 2/1984 | United Kingdom | 181/106 |

Primary Examiner—Nelson Moskowitz
Attorney, Agent, or Firm—Alexander J. McKillop; Michael G. Gilman; George W. Hager, Jr.

[57] ABSTRACT

A bender acoustic transducer has a flat, piezoelectric element affixed to a flat, elongated inert element. The ends of the inert element are hinged on a supporting rectangular frame which has a rectangular opening. Two sides of the elements are exposed so that when a voltage is applied, a dipole acoustic wave is generated by the transducer.

15 Claims, 3 Drawing Sheets

BI-POLAR BENDER TRANSDUCER FOR LOGGING TOOLS

This is a continuation of copending application Ser. No. 866,560, filed on May 23, 1986 now abandoned.

BACKGROUND OF THE INVENTION

The invention relates to bi-polar transducers and more particularly, to a transducer for logging boreholes.

Open boreholes are logged with acoustic pulses to determine the velocities of compressional and shear waves traveling through the earth formations surrounding the borehole. By timing the travel of acoustic waves between the transmitters and receivers of a logging tool, the nature of these surrounding formations is determined. U.S. Pat. No. 4,516,228—Zemenek describes a logging tool for detecting both compressional and shear waves.

Monopole transducers typically generate a compressional wave by generating a pressure pulse on one side of the transducer which radiates outwardly from the transducer. Bender transducers typically are monopole transducers which generate compressional waves U.S. Pat. Nos. 3,363,118—Sims and 3,380,019—Sims disclose bender transducers for use in open water. These transducers include a disk and a piezoelectric material which flexes the disk in a bender action. The disk is fixed around its edge, as by a support ring in the Sims '118 patent so that when a voltage is applied to the piezoelectric material, the center portion of the disk flexes. Alternatively, these transducers are used as receivers which convert acoustic energy to an electrical signal.

U.S. Pat. No. 4,383,308—Caldwell discloses the use of a bender transducer in a borehole logging tool. The operating environments of a borehole and open water are quite different, as are the respective transmission media and associated instrumentation. A transducer used in a logging tool must be capable of operating under high temperatures, typically 300°–350° F.

Another known type of acoustic transducer is referred to as a "bender bar" transducer, such as the one made by Honeywell, Inc. This comprises a stack of flat piezoelectric elements which are supported at one end. When a voltage is applied, the other end of the stack moves to produce a monopole pulse of energy. One way to use bender bar transducers in a logging tool would be to provide a circular array of such devices, with each bender bar stack producing energy which radiates outwardly from the tool. However, the constraints of a logging tool do not provide enough room for such an array of sources. The industry standard logging tool is $3\frac{5}{8}''$ in diameter which severely constrains the size of the transducer.

It is an object of the present invention to provide a bender transducer which will fit into an industry standard logging tool, and which will withstand the severe conditions of borehole logging.

It is another object of the present invention to provide a bender transducer which will radiate a dipole wave with positive pressure pulses on one side of the transducer, and negative pressure pulses on the other side of the transducer.

SUMMARY OF THE INVENTION

In accordance with the present invention, a bender transducer includes a flat, elongated piezoelectric element affixed to a flat elongated inert element. The inert element is hinged at both ends to a supporting mass or frame which exposes two sides of the elements. When a voltage is applied to the electrodes of the piezoelectric element, the inert element flexes, moving about the hinges at both ends. This produces a dipole shear wave in the fluid surrounding the logging tool. Alternatively, of course, the transducer of the present invention can be used as a receiver to convert acoustic energy into an electric signal.

In accordance with an important aspect of the invention, baffles on the supporting frame acoustically separate the two sides of the elements. This prevents an acoustic "short circuit", which would otherwise be present if a typical bender transducer was used as a dipole generator.

In accordance with another aspect of the invention, a second piezoelectric element is affixed to the other side of the inert element. Opposite voltages are applied to the two piezoelectric elements, so that one tends to compress and other expand to impart a reinforced flexing motion to the inert element.

In accordance with other aspects of the invention, the dimensions of the supporting frame and elements are critical to produce the desired frequency acoustic wave, about 1 KHz.

The present invention has the advantages of compact size, good frequency characteristics, good temperature stability and ruggedness, all of which makes the transducer of the present invention particularly suitable for use in a borehole logging tool.

The foregoing and other objects, features and advantages of the invention will be more apparent from the following more detailed description and appended claims.

SHORT DESCRIPTION OF THE DRAWINGS

DESCRIPTION OF THE PREFERRED EMBODIMENT

Figures 1, 1A:
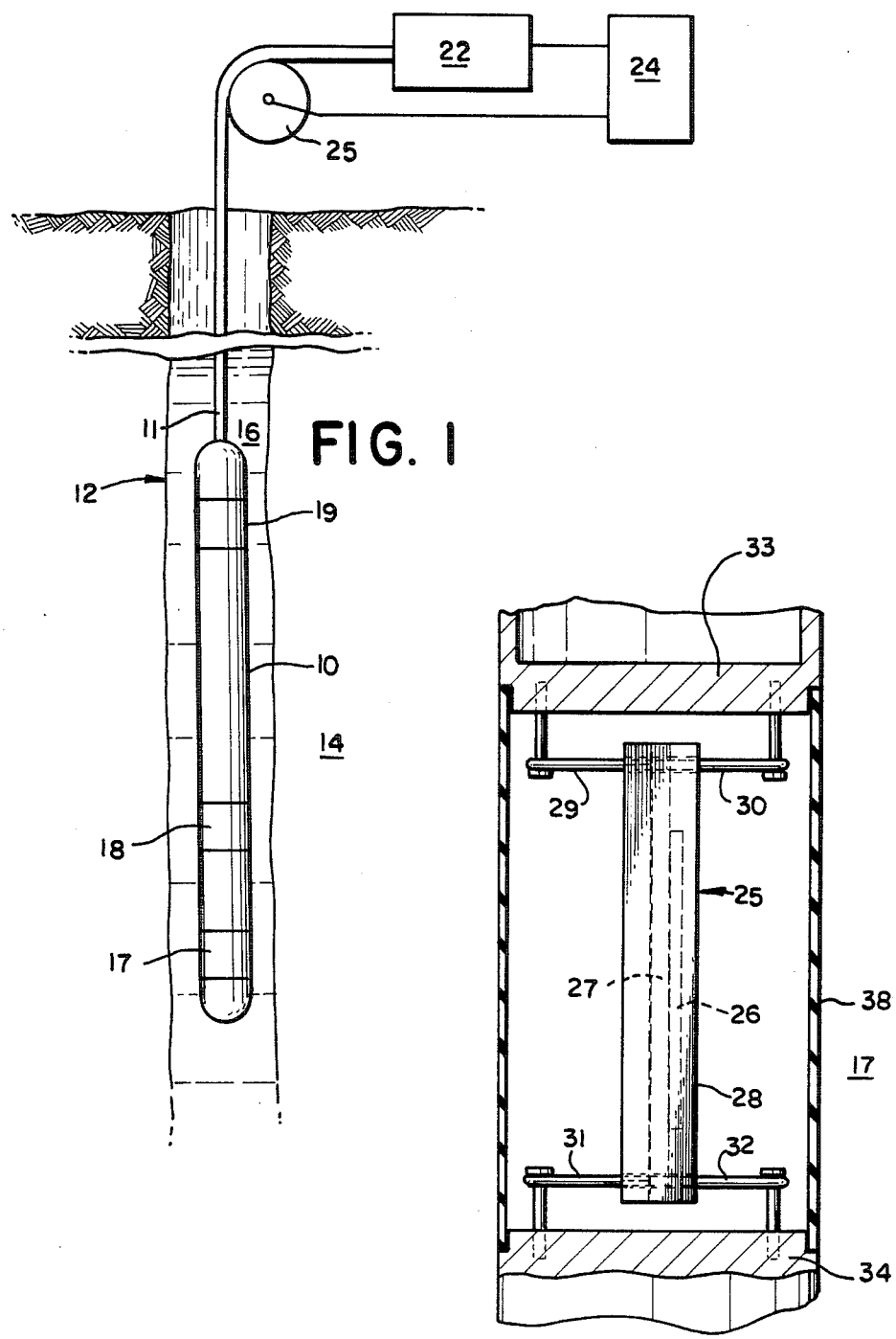
FIG. 1 shows a well logging system with a logging tool in a borehole.
FIG. 1A shows the transducer of the present invention mounted in the logging tool.

Referring to FIGS. 1 and 1A, an acoustic logging system has the improved transducer of the present invention. The logging system includes an elongated logging tool 10 which is suspended from a cable 11 within a borehole 12 which traverses a subterranean formation of interest 14. Formation 14 may be a suspected oil or gas bearing formation which is to be characterized in regard to its porosity, fluid saturation, or such other information as may be desired. The well 12 is filled with a liquid such as drilling mud 16. The logging tool 10 comprises acoustic transmitters 17 and 18 and the acoustic receiver 19.

Signals from the logging tool 10 are transmitted uphole by the conductors in cable 11 to a utilization system comprising control circuit 22 and recorder 24. A depth indicating means, such as a measuring sheave produces a depth signal which is applied to the recorder 24 in order that the output from control circuit 22 may be correlated with depth.

The mounting of the bender transducer of the present invention in the logging tool is shown in more detail in FIG. 1A. Transducer 25 comprises a piezoelectric element 26 affixed to inert element 27, which is typically an aluminum plate. The plate is mounted at both ends to the supporting mass or frame 28. Vicom rubber straps 29-32 suspend the transducer in the transducer compartment formed by the panels 33 and 34 and neoprene rubber protective casing 35. The transducer compartment is filled with a suitable coupling liquid which has an acoustic impedance close to that of the liquid within the borehole.

Figure 2:
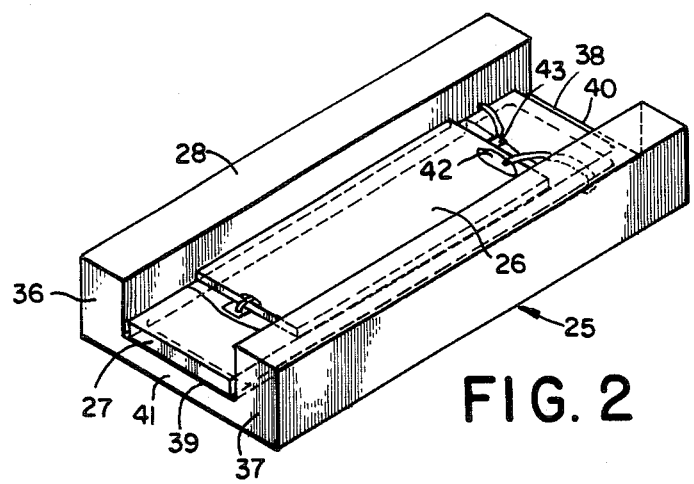
FIG. 2 is a perspective view of the transducer.

FIG. 2 depicts an embodiment of the invention wherein one flat, elongated piezoelectric element 26 is mounted on the flat, elongated inert element 27. Inert element 27 is affixed to a supporting mass, or frame 28 at both ends of inert element 27. Frame 28 has baffles 36 and 37 which acoustically separate the exposed sides of the transducer. Fiberglass layers 38 and 39 bond the inert element 27 to the sides 40 and 41 of frame 28. These sides act as hinges when a voltage applied to electrodes 42 and 43 causes the inert element to flex.

Figure 3:
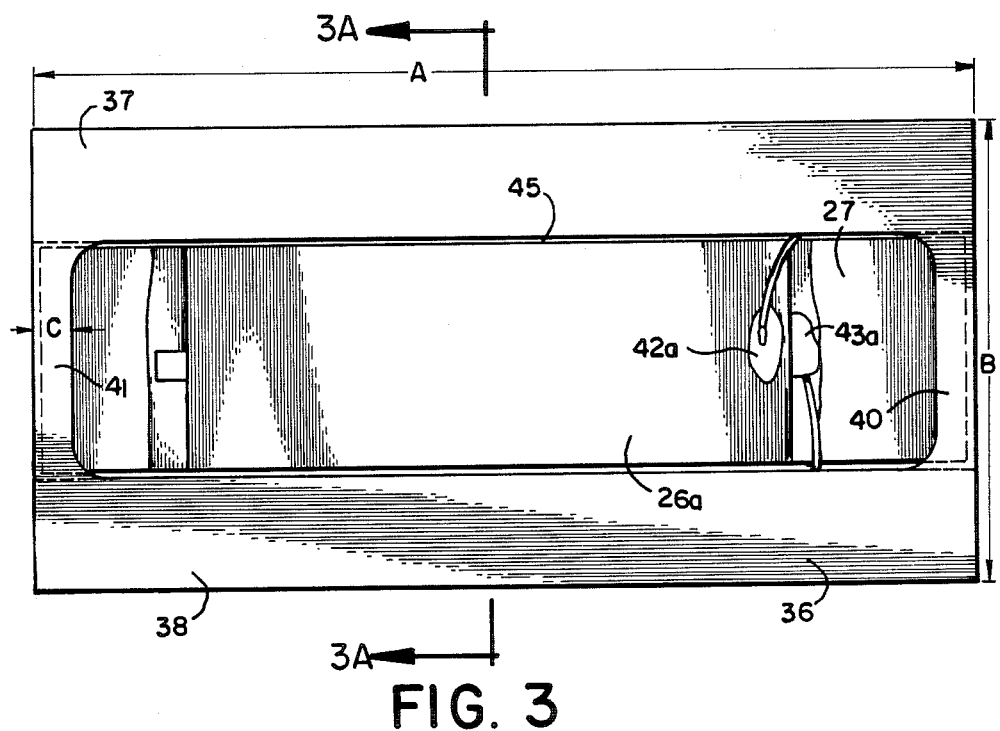
FIG. 3 is a bottom plan view of a transducer with two piezoelectric elements.

Frame 28 is rectangular, with a rectangular opening, best seen in the bottom plan view of FIG. 3. Sides 40 and 41 are on opposite sides of the rectangular opening. These sides twist in a hinge-like movement as the inert element 27 flexes in response to applied voltage. This produces a bi-polar acoustic wave when the exposed top surface of element 26 produces a positive pressure pulse and the bottom exposed surface of element 27 (FIG. 2) produces a negative pressure pulse, or vice versa.

Figure 4:
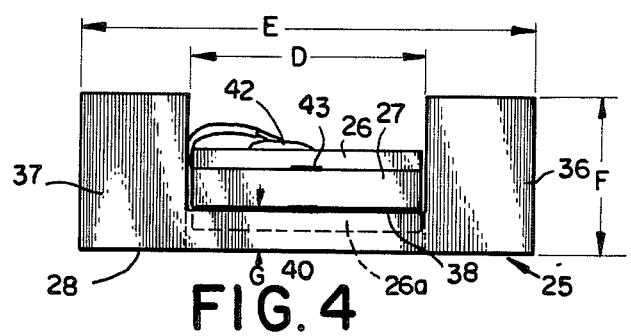
FIG. 4 is an end view of the supporting frame.
Figure 5:
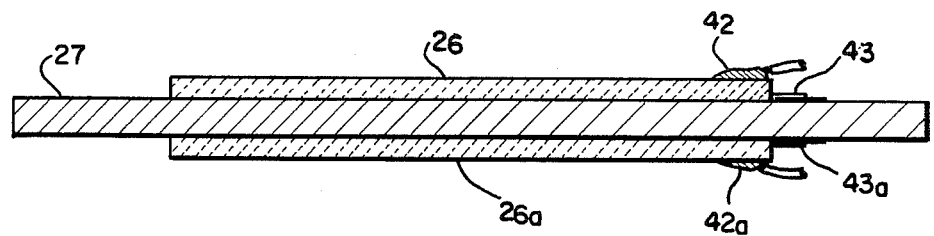
FIG. 5 is an end view of the transducer.

FIGS. 3-5 show an embodiment in which another piezoelectric element 26a is mounted on the bottom side of inert element 27. Like reference numerals, or reference numerals with "a" affixed thereto, indicate like components to the embodiment described with reference to FIG. 2. In this embodiment, one side of each piezoelectric element is exposed and the other side is affixed to the inert element. The two exposed surfaces of the piezoelectric elements respectively generate positive and negative pressure pulses to produce a bi-polar acoustic wave.

Figure 3A:
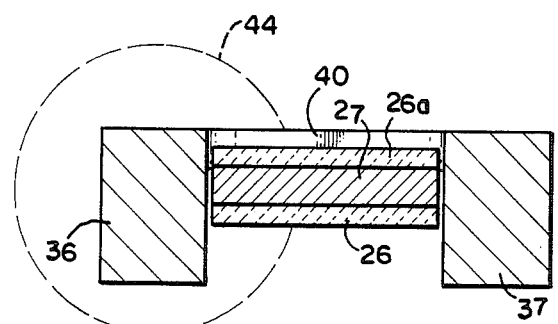
FIG. 3A is a section on the line 3A—3A of FIG. 3.

FIG. 3A depicts an important function of the baffles 36 and 37. These baffles acoustically separate the two exposed surfaces of the elements. The acoustic energy generated must take the path indicated by the dashed lines 44. Without this acoustic baffling, the acoustic energy would take the shortest path between the two exposed surfaces and would not generate the desired acoustic wave.

Figure 6:
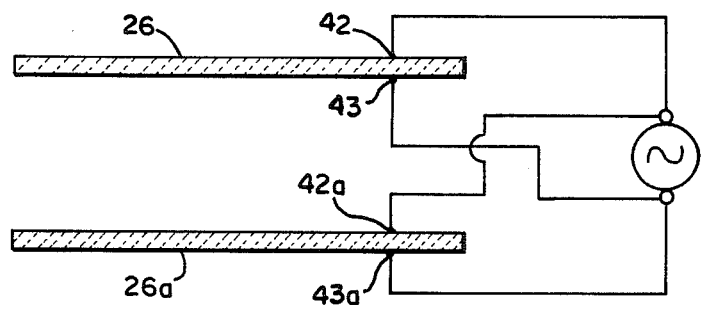
FIG. 6 depicts the electrical connections to the transducer.

FIG. 6 depicts the electrical connections to the two piezoelectric elements 26 and 26a. An alternating voltage is applied to the two opposed surfaces of the piezoelectric elements. The voltage on one side is positive-going while the other is negative-going, and vice versa. This results in the element 26 being compressed and the element 26a being expanded during one half cycle, and vice versa during the other half cycle. This reinforces the flexing of the inert element 27. By applying an alternating voltage at the proper frequency, an acoustic wave at the desired frequency is produced.

Certain dimensions of the transducer are critical to the generation of the acoustic wave at the desired frequency. The width of the sides 40 and 41 of the frame are critical. This dimension, from the outside of the frame to the edge of the rectangular opening, must be correctly chosen to provide the desired hinge-like movement. Another critical dimension is the width of the space 45 (FIG. 3) between the edge of the frame and the edge of the inert element. This space must be sufficiently small so that liquid does not easily pass through the opening without producing the desired wave. At the same time, the opening must be large enough so that unwanted viscous damping does not occur.

In an exemplary embodiment of the invention, piezoelectric elements 26 and 26a were 4" PZT-4 material supplied by EDO Western Corporation, Salt Lake, Utah. Elements 26 and 26a were 1.25 inches thick, cut to 1.5 inch widths. They were bonded to inert element 27 with one layer of fiberglass.

Inert element 27 was a 6.125×1.5×0.25 piece of aluminum stock 6061-T6. Leads of #26 wire were attached to the electrode and the elements were potted in DC 170 A & B. The capacitance was 0.0145 microfarads. The frame 28 was cold rolled steel with the following dimensions referenced to FIGS. 3 and 4.

A: 2.5 inches
B: 3.00 inches
C: 2.5 inches
D: 1.70 inches
E: 3.00 inches
F: 1.00 inches
G: 0.375 inches A DC voltage of up to about 1,000 volts RMS was applied to the transducer at about 1 KHz. The desired 1 KHz acoustic wave was produced.

While a particular embodiment of the invention has been shown and described, various modifications are within the true spirit and scope of the invention. The appended claims are, therefore, intended to cover all such modifications.

What is claimed is:

1. An acoustic transducer for a borehole logging tool comprising:

a compartment filled with a coupling liquid;
   a flat, elongated, piezoelectric element having an exposed side and a second side, said piezoelectric element having electrodes on both of said sides;
   a flat, elongated, inert element having an exposed side and a second side, said second side of said piezoelectric element being affixed to said second side of said inert element;
   a supporting mass suspended in said borehole logging tool, said inert element being hinged to said supporting mass; and
   means for applying a voltage to said electrodes to flex said inert element, whereby a bi-polar acoustic wave is generated by said exposed side of said piezoelectric element and said exposed side of said inert element into said coupling liquid;
   said edge of said inert element and said side of said supporting mass separated by a specified distance to define a space, said space permitting transmission of said bi-polar acoustic wave to said borehole logging tool; and
   said supporting mass including means for separating said acoustic energy generated into said coupling liquid by said exposed side of said piezoelectric element and said exposed side of said inert element.

2. The acoustic transducer recited in claim 1, wherein said means for separating two sides of said elements comprises:

baffles on said supporting frame.

3. The acoustic transducer recited in claim 1 wherein said supporting mass is a frame, said inert element being affixed to said frame at both ends of said element, said piezoelectric element and said inert element being exposed by said frame.

4. The acoustic transducer recited in claim 3 wherein said frame extends around a rectangular opening, opposed ends of said inner element being affixed to the sides of said frame on opposite sides of said rectangular opening, said sides twisting in a hinge-like movement as said inert element flexes.

5. The acoustic transducer recited in claim 1 further comprising:
    another piezoelectric element affixed to the other side of said inert element, one side of each piezoelectric element being exposed and the other side being affixed to said inert element.

6. The acoustic transducer recited in claim 4, wherein said frame has sides of approximately 3.00 inches in length.

7. The acoustic transducer recited in claim 4, wherein one element compresses when a voltage is applied and the other expands to impart a flexing movement to said inert element.

8. The acoustic transducer recited in claim 5, wherein said means for separating two sides of said elements further comprises baffles on said supporting frames.

9. A borehole logging tool for investigating subterranean formations by traversing a borehole filled with a liquid while generating acoustic waves for reflection by said subterranean formation comprising:
    at least one acoustic transmitter for generating acoustic waves into said subterranean formation;
    an acoustic receiver for receiving acoustic waves reflected by said subterranean formation; and
    means for transmitting data related to said received acoustic waves from said logging tool;
    said acoustic transmitter comprising:
        at least one panel forming a transducer compartment, said transducer compartment filled with a coupling liquid having an acoustic impedance close to that of the liquid within said borehole;
        a flat, elongated, piezoelectric element having an exposed side and a second side, said piezoelectric element having electrodes on both of said sides;
        a flat, elongated, inert element having an exposed side and a second side, said second side of said piezoelectric element being affixed to said second side of said inert element;
    a supporting mass suspended in said transducer compartment, said inert element being hinged to said supporting mass; and
    means for applying a voltage to said electrodes to flex said inert element;
    whereby a bi-polar acoustic wave is generated by said exposed side of said piezoelectric element and said exposed side of said inert element;
    said edge of said inert element and said side of said supporting mass separated by a specified distance to define a space, said space permitting transmission of said bi-polar acoustic wave to said borehole logging tool; and
    said supporting mass including means for separating said acoustic energy generated into said coupling liquid by said exposed side of said piezoelectric element and said exposed side of said inert element.

10. The borehole logging tool recited in claim 9, wherein said means for separating two sides of said elements further comprises baffles on said supporting frame.

11. The borehole logging tool recited in claim 9, further comprising:
    another piezoelectric element affixed to the other side of said inert element, one side of each piezoelectric element being exposed and the other side being affixed to said inert element.

12. The borehole logging tool recited in claim 9, wherein said supporting mass is a rectangular frame, said inert element being affixed to said frame at both ends of said element, said piezoelectric element and said inert element being exposed by said frame.

13. The borehole logging tool recited in claim 12, wherein said frame extends around a rectangular opening, opposed ends of said inner element being affixed to the sides of said frame on opposite sides of said rectangular opening, said sides twisting in a hinge-like movement as said inert element flexes.

14. The borehole logging tool recited in claim 13, wherein said frame has sides of approximately 3.00 inches in length.

15. The borehole logging tool recited in claim 13, wherein one element compresses when a voltage is applied and the other expands to impart a flexing movement to said inert element.

* * * * *